(12) United States Patent
Marquez et al.

(10) Patent No.: US 10,860,413 B2
(45) Date of Patent: Dec. 8, 2020

(54) INTERACTIVE MOBILE POINT OF SALE REMOTE MONITORING SYSTEM

(71) Applicant: NCR Corporation, Atlanta, GA (US)

(72) Inventors: Helfe Padayao Marquez, Negros (PH); Eunice Faith Batuhinay Pude, Baclayon (PH)

(73) Assignee: NCR Corporation, Atlanta, GA (US)

( * ) Notice: Subject to any disclaimer, the term of this patent is extended or adjusted under 35 U.S.C. 154(b) by 120 days.

(21) Appl. No.: 16/226,794

(22) Filed: Dec. 20, 2018

(65) Prior Publication Data

US 2020/0201703 A1 Jun. 25, 2020

(51) Int. Cl.
| | | |
|---|---|---|
| *G06F 11/00* | (2006.01) | |
| *G06F 11/07* | (2006.01) | |
| *G06Q 20/20* | (2012.01) | |
| *G06F 21/32* | (2013.01) | |

(52) U.S. Cl.
CPC ...... *G06F 11/0793* (2013.01); *G06F 11/0709* (2013.01); *G06F 11/0742* (2013.01); *G06F 11/0751* (2013.01); *G06F 11/0769* (2013.01); *G06F 11/0778* (2013.01); *G06F 21/32* (2013.01); *G06Q 20/202* (2013.01)

(58) Field of Classification Search
CPC ............. G06F 11/0709; G06F 11/0751; G06F 11/0778; G06F 11/0784; G06F 11/0787; G06F 11/3055; G06F 11/321
See application file for complete search history.

(56) References Cited

U.S. PATENT DOCUMENTS

| | | | |
|---|---|---|---|
| 10,534,680 B1 * | 1/2020 | Wood | G06F 11/3466 |
| 2003/0212601 A1 * | 11/2003 | Silva | G06Q 20/204 705/17 |
| 2013/0205133 A1 * | 8/2013 | Hess | H04L 63/0884 713/155 |

* cited by examiner

*Primary Examiner* — Charles Ehne
(74) *Attorney, Agent, or Firm* — Schwegman, Lundberg & Woessner

(57) ABSTRACT

A computer implemented method includes detecting point of sale (POS) terminal issues via a software agent executing on the POS terminal, generating an issue report that identifies the issues, labels the issues, and includes an issue description, and transmitting the issue report to a server to generate an interface for a mobile device that provides a graphical user interface (GUI) displayed on a display of the mobile device based on the transmitted issue report that identifies a status of at least one POS terminal.

18 Claims, 12 Drawing Sheets

605

```
9/4/2018 3:48:28 AM    RECEIVED MESSAGE FROM 127.0.0.1:  SUBSCRIBEDEVENTOCCURRED
SEQUENCENUM = 0
TERMINAL = TERMINALINFO
    ADDRESS = 127.0.0.1
    UNIQUEID = F477C905-3970-4492-9A86-CC527A164BA9
    CUSTOMERCODE = 12345
    PROPERTIES =
        [0] [TERMINALID] = 7606-12345678
        [1] [MACHINENAME] = 7606-12345678
        [2] [UAVERSION] = 03.09.02.01
        [3] [CUSTOMERCODE] = 12345
        [4] [GUID] = F477C905-3970-4492-9A86-CC527A164BA9
        [5] [IPADDRESS] = 127.0.0.1
        [6] [MACADDRESS] = 00:00:00:00:00:00
    COLLECTORINFO =
        [0] [VERSION] = 1.4.0.0
EVENTNAME = NCR.RPSW.PREDICTIVESERVICESCOLLECTOR.RPSWEVENTLOGENTRY
EVENTDETAILS =
    [0] = MANAGEMENTEVENTINFO
        CLASSURI = NCR.RPSW.PREDICTIVESERVICESCOLLECTOR.RPSWEVENTLOGENTRY
        PROPERTIES =
            [0] [SOURCE] = NCROPOSSO.POSPRINTER
            [1] [ID] = 11817
            [2] [TYPE] = WARNING
            [3] [CATEGORY] = HARDWARE
            [4] [MESSAGE] = THE RECEIPT STATION IS RUNNING LOW ON PAPER AND WILL NEED REPLACED SOON.

MEANING:
MODEL "NCROPOSSO.POSPRINTER", INSTANCE: "POSPRINTER 7167 R2" FSMID: POSPRINTER 7167 R2

ACTION:
THE RECEIPT PAPER LOW SENSOR IN THE PRINTER HAS DETECTED THAT THE PAPER IS NEARING THE END OF THE ROLL.
THE ACTUAL NUMBER OF TRANSACTIONS OR LINES THAT CAN BE PRINTED BEFORE PAPER IS COMPLETELY OUT DEPENDS ON
THE PRINTER, SENSOR ADJUSTMENT, AND TRANSACTIONS SIZES. MAKE SURE A REPLACEMENT ROLL OF PAPER IS AVAILABLE
AT THE SITE WHERE THE PRINTER IS INSTALLED. DEPENDING ON STORE PROCEDURES, YOU MAY WANT TO REPLACE THE
PAPER NOW, OR WAIT UNTIL AN OUT-OF-PAPER ALERT IS RECEIVED.
            [5] [DATA] = NCR.APTRA.IMGMTSERVERCOMMS.UANULLPTR
            [6] [EVENT TIMESTAMP] = 04/09/2018 03:48:28 -4
            [7] [UTCTIMESTAMP] = 9/4/2018 7:48:28 AM
CLASSDETAILS =
    <ZERO LENGTH>
DOCUMENTFRAGMENT = DOCUMENT
    URI =
    INSTANCENAME =
    COMMAND = REBUILDANDRETRIEVE (0)|
    DATA =
```

*Fig. 6B*

INTERACTIVE MOBILE POINT OF SALE REMOTE MONITORING SYSTEM

BACKGROUND

Point of sale (POS) terminals may fail during customer transactions, or even during quality assurance (QA) operations. Some POS terminals are remote from retail locations, such as automated teller machines and other kiosks. It may take significant time to troubleshoot errors and other issues associated with the failure. In retail stores, a manager usually has to come to the POS terminal in a checkout lane to resolve the failure, using a password to override an operator (checkout clerk) mode. Late reports or errors or warnings, such as printer paper-low, paper jam, POS Terminal overheating, cash drawer burnt issue, etc., can lead to further delay and customer frustration. Remote POS terminals with failures can take even longer to resolve.

SUMMARY

A computer implemented method includes detecting point of sale (POS) terminal issues via a software agent executing on the POS terminal, generating an issue report that identifies the issues, labels the issues, and includes an issue description, and transmitting the issue report to a server to generate an interface for a mobile device that provides a graphical user interface (GUI) displayed on a display of the mobile device based on the transmitted issue report that identifies a status of at least one POS terminal.

BRIEF DESCRIPTION OF THE DRAWINGS

FIG. 6B is a text representation of the information provided on the GUI of FIG. 6A according to an example embodiment.

DETAILED DESCRIPTION

Figure 1:
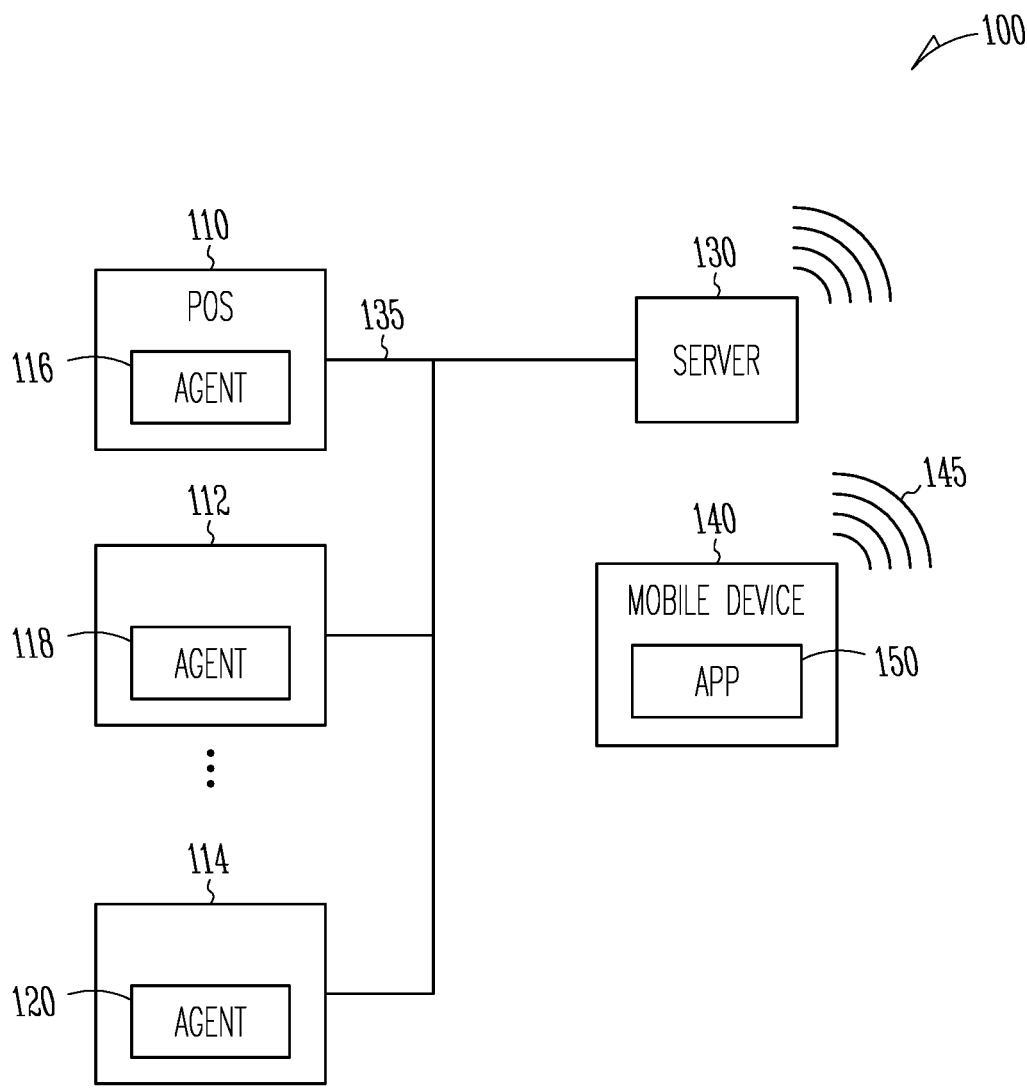
FIG. 1 is a block diagram view of a system for implementing remote POS monitoring according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

In various embodiments or examples of the present inventive subject matter, a server-based and mobile device-based system provides Point-Of-Sale (POS) operational monitoring support services. The system monitors multiple POS terminals for issues or failures, such as needs receipt paper, needs media paper, cash low, etc. Information regarding failures is provided to a mobile device APP for resolution by a user. The system may also provide in-transaction transaction assistance via the mobile APP running on the mobile device while remotely coupled to the POS terminal.

FIG. 1 is a block diagram view of a system 100 for implementing remote POS monitoring. System 100 may include multiple POS terminals 110, 112, 114. Various embodiments may include fewer or more POS terminals. The POS terminals 110, 112, 114 each contain an agent 116, 118, 120 respectively that monitors performance of the respective POS terminals. The agent may monitor one or more of operating system (Windows® for example) event log errors, unified agent processes and services running, EBI service running, and registry information set during installation check. The agent may be part of existing POS monitoring and predictive services APP already installed in POS terminals. The agent is capable of detecting POS terminal issues, such as failures and automatically sends an issue report to a server 130 via connections 135. Connections 135 may be hard wired, such as via an Ethernet connection, or wireless, such as WiFi, Bluetooth, or other means for communicating between the server and the POS terminals.

The issue reports may be sent contemporaneously with the detected issue. Contemporaneously means that the issue reports are prepared in response to the issue being detected, and queued for transmission in computer related time frames, which seems almost instantaneous or simultaneously to users. In some embodiments, contemporaneously means within a few seconds of detection of the issue.

The issue report may include information about the failure, such as labels and features along with an error description (ApplicationHang/ApplicationCrash/InstallationFail, etc.), decoded error code, ExceptionDetails, etc.

A mobile device 140 is coupled to the server via WiFi, cellular or other means as indicated at 145. The mobile device obtains the information from the server and processes the information via a mobile APP 150. The APP provides a graphical user interface (GUI) that provides views of the data and may also establish a video conference type connection with the POS terminal. The APP 150 may also provide views of the status of all the POS terminals coupled to the server, or at least POS terminals the user is responsible for monitoring, such as all the POS terminals in a retail location or other location, or even including multiple remote POS terminals. The term remote is used to indicate that the user may monitor POS terminals without directly/physically interacting with the POS terminals. Remote monitoring may include the user being right next to the POS terminals, in the same room, or miles/kilometers away from the POS terminals. Multiple mobile devices may be coupled to the server in further examples.

The software-based agent on each POS terminal monitors the terminal to send diagnostic information and activity information to the server. Labels are generated and added to the information. Labels may include one or more of, error type followed by the error code, id of the POS terminal, date, time, frequency of occurrence for this error type in some preconfigured period of time or since last booted, etc. The mobile APP provides the diagnostic information to allow a user to view diagnostic information about one or more POS terminals without having to directly interact with such POS terminals.

The mobile APP on the mobile devices of supervisors or staff of the retailer do not have to have a connection to the POS terminal to access the server and obtain a summary and details on each of the POS (and generate graphs, etc.) A graphical user interface (GUI) on the mobile may be used view the information. Views of the diagnostic information for all of the POS terminals may be provided on the mobile device APP GUI by a designated supervisor. The diagnostic information may be viewed in summary or via user-driven views by connecting the APP to a server and without directly connecting to the POS terminals at any given point in time. Statistics for the diagnostics/metrics and graphs are available in the GUI of the managing mobile app of the supervisor. Note that in some embodiments, a mobile device may operate as the server, or as a server as well as executing the APP.

The mobile APP provides a mechanism for the supervisor to directly connect (through the same agent on the POS or a different agent) during a customer transaction. A customer may be performing a transaction wherein the POS terminal is a Self-Service Terminal (SST or kiosk), or a clerk may be assisting with checkout via a cashier-assisted POS in various embodiments. During the connection and while a transaction is ongoing, the supervisor can use the APP on the mobile device to provide overrides to move the transaction along (e.g, correct a price of an item, override need to see ID for alcohol purchase, etc.). The APP provides the transaction details. A two-way video conference between the party transacting (customer or clerk) can be established between the POS and the mobile device of the supervisor.

The system 100 allows supervisors to be immediately notified if problems, such as errors or failures occur in POS terminals, including self-service checkouts anywhere or any time of day. The system 100 may provide complete and immediate reports to technical support personnel to allow immediate response to problems before the problems become worse. All issued may be recorded, as well as statistical or graphical records of every error/issue occurring may be provided to help development of strategies to stop issues from occurring.

Cancelling or modification of transactions can be performed more quickly because supervisors or managers no longer need to proceed to a POS terminal, input a password or swipe a card to override an operator mode, and manually inspect the POS terminal, to cancel or modify a transaction. In retail locations with multiple checkout lanes, the customer no longer has to wait for the manager to arrive at the lane, and the manager no longer has to move between different lanes to resolve issues.

Figure 2:
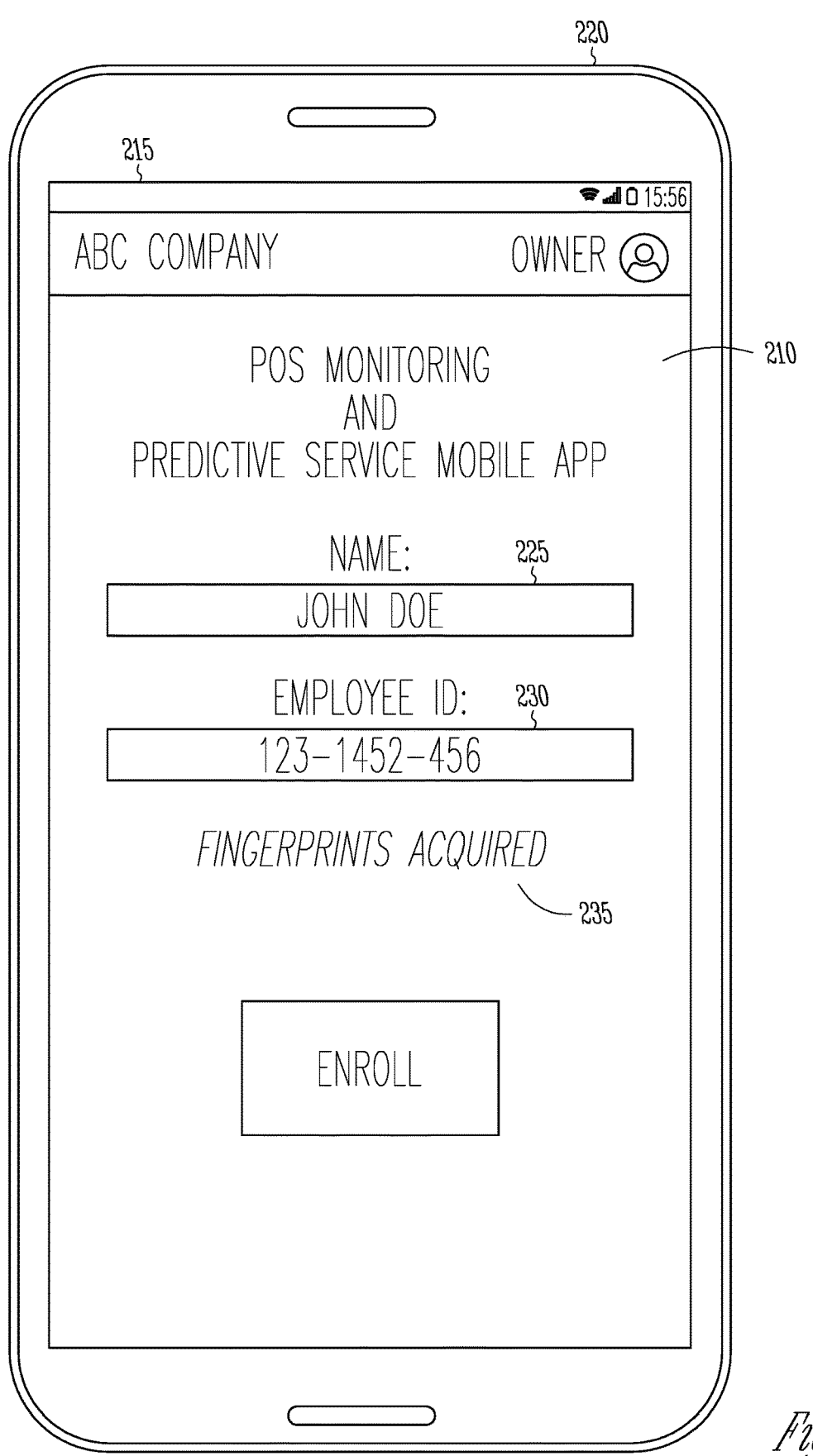
FIG. 2 is a line drawing representation of a GUI for use in enrolling a user and user mobile device into the system according to an example embodiment.

FIG. 2 is a line drawing representation 200 of a GUI 210 displayed on the screen 215 of the mobile device 220 for use in enrolling a user and user mobile device 220 into the system. In one embodiment, the mobile APP is part of an existing POS monitoring and predictive service mobile app as shown. The GUI 210 provides information describing the ABC Company for example, and includes a name field 225 with the name John Doe filled in, and an employee id labeled filed 230 with an id filled in. The mobile device in this example already has a fingerprint access mechanism that has been trained by the user as indicated by the displayed text at 235: "Fingerprints acquired". An "enroll" button 240 is shown to allow the employee, such as a manager or supervisor to gain access to the server and mobile APP. Selection of the enroll button 240 results in the user being enrolled, and able to access the system via the mobile APP.

Figure 3:
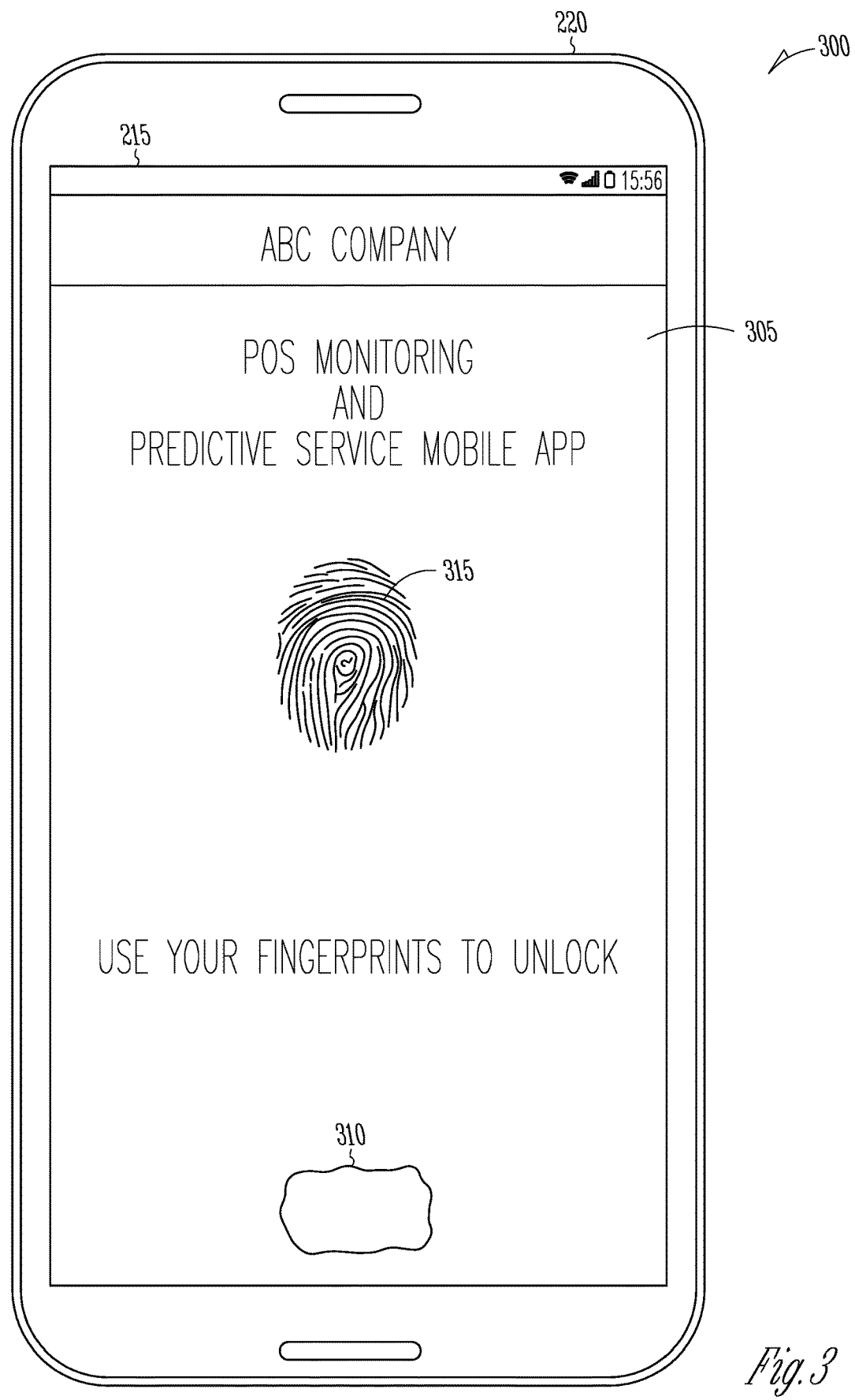
FIG. 3 is a line drawing representation of a GUI to allow the user to gain access to a mobile APP according to an example embodiment.

FIG. 3 is a line drawing representation 300 of a GUI 305 displayed on the screen 215 of the mobile device 220 that may be displayed to allow the user to gain access to the server and mobile APP once enrolled. The user may use a fingerprint on a fingerprint sensing area 310 to gain access. A fingerprint representation 315 provides a visual indication that a fingerprint may be used for access. In some embodiments, the fingerprint representation may be an icon that a user selects to enable fingerprint access to the mobile device APP and server. In still further embodiments, a simple password, or other means for accessing the system may be used, including various biometrics such as face recognition, or behavioral metrics.

Figure 4:
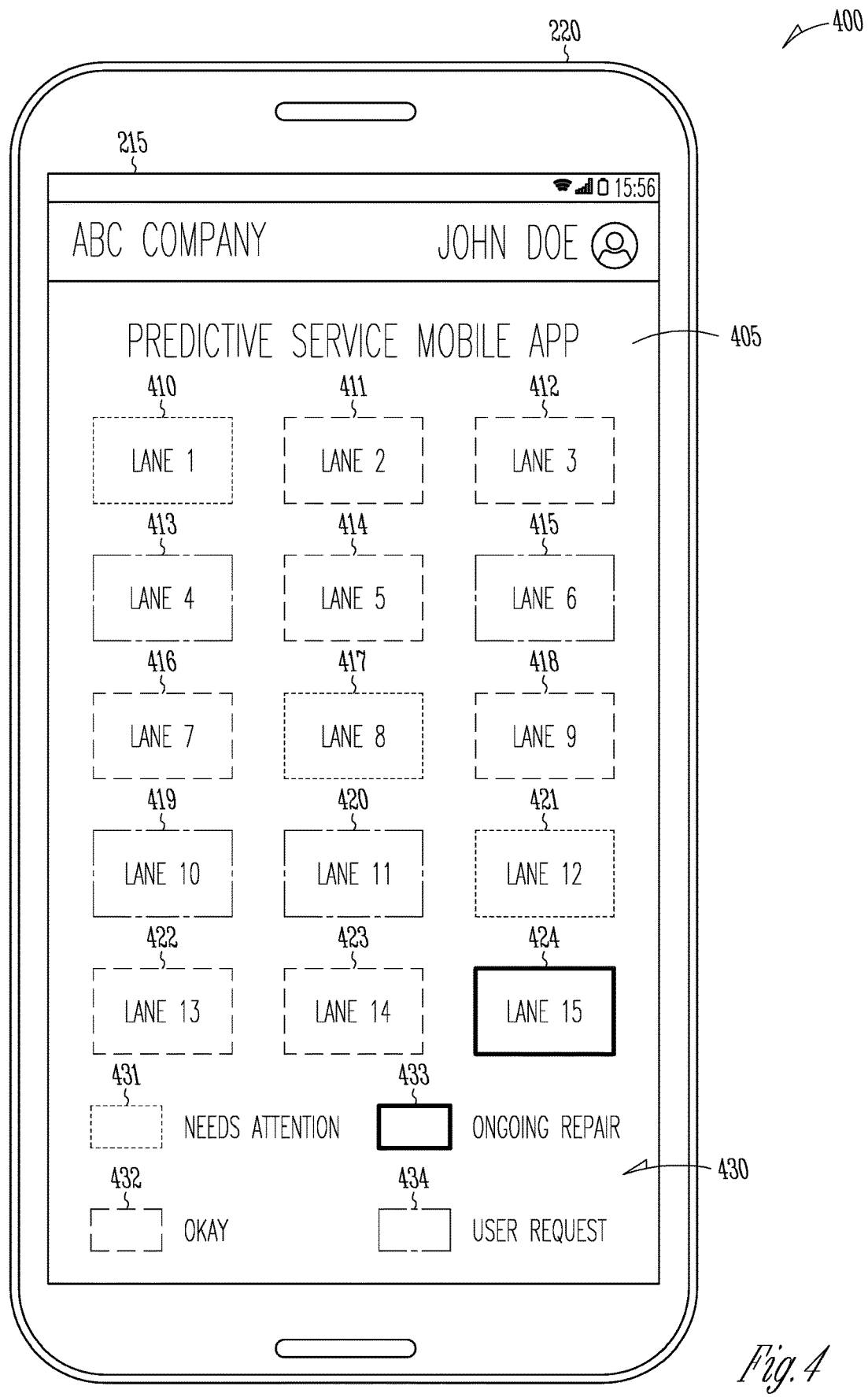
FIG. 4 is a line drawing representation of a GUI to show the status of multiple lanes at which POS terminals are deployed according to an example embodiment.

FIG. 4 is a line drawing representation 400 of a GUI 405 displayed on the screen 215 of the mobile device 220 that may be displayed to show the status of multiple lanes at which POS terminals are deployed. Fifteen lanes are represented with icons indicated at 410, 411, 412, 413, 414, 415, 416, 417, 418, 419, 420, 421, 422, 423, and 424 corresponding to lanes 1-15 respectively. In one embodiment, the icons are color coded corresponding to the information provided by the agent at each POS. Lanes 1, 8, and 12 are colored red, corresponding to "needs attention" as indicated in a key 430 at 431. The color green, indicated in the key at 432, corresponds to the lane being ok. Lanes 2, 3, 5, 7, 9, 13, and 14 are correspondingly ok as indicated by a green color of the corresponding icons. Yellow is indicated in the key at 433 and corresponds to a lane undergoing and ongoing repair. Lane 15 is currently indicated as such. Blue is indicated in the key at 434 and corresponds to a user being present with user request, or in other words, POS terminals in lanes 4, 6, 10, and 11 are being used by a customer for self-checkout, are assigned to a clerk that is either helping a customer or otherwise ready to help a customer, and the user wants to perform an action that that requires manager/supervisor permission. While certain colors are indicated in GUI 405, other colors may be used. In other embodiments, different text attributes may be used to distinguish the status of each lane/POS terminal, such as bold, script, underlining, blinking, etc.

Figure 5:
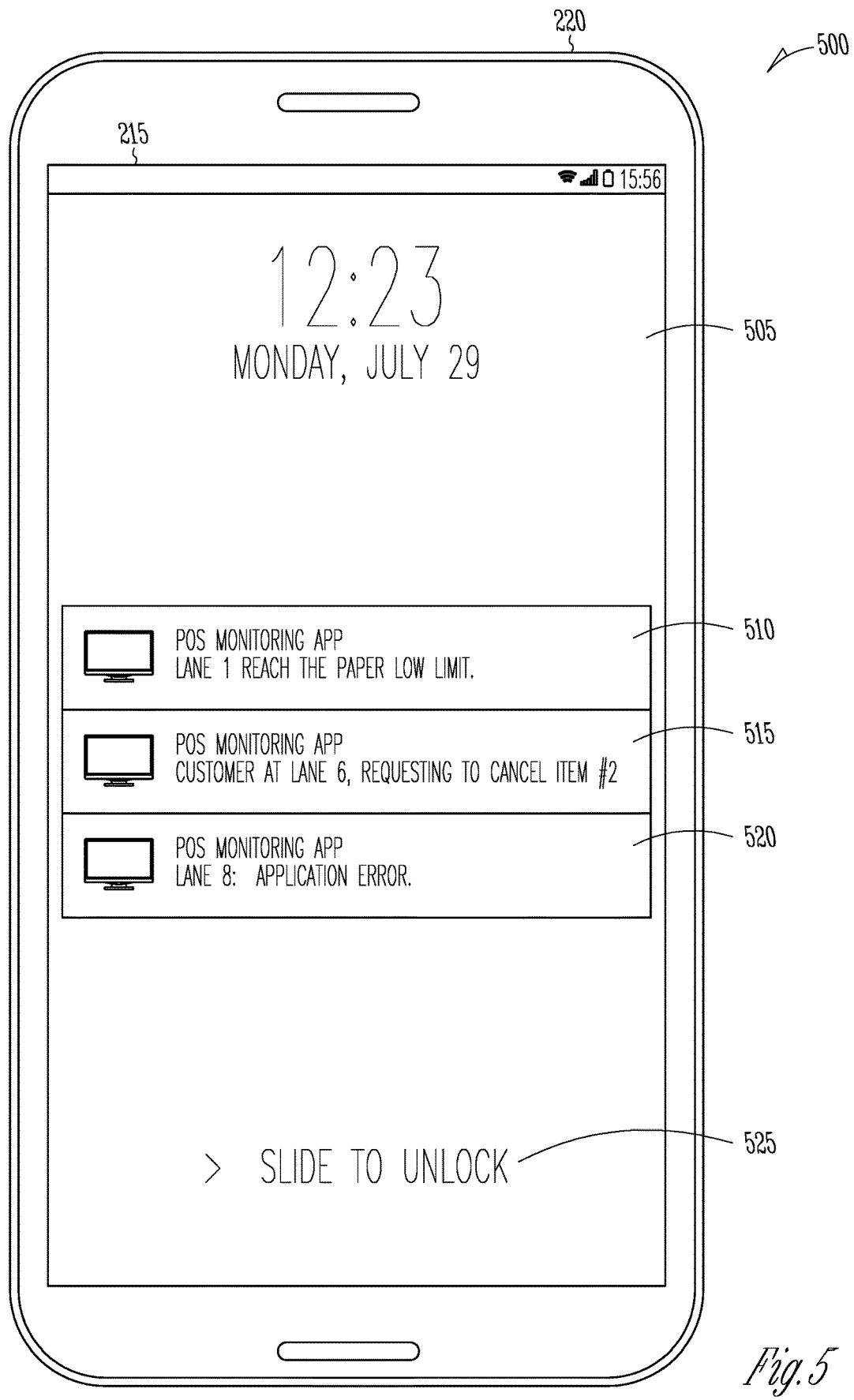
FIG. 5 is a line drawing representation of a GUI displayed while the mobile device is locked according to an example embodiment.

FIG. 5 is a line drawing representation 500 of a GUI 505 displayed on the screen 215 of the mobile device 220 that may be displayed while the mobile device, such as a cell phone, is locked and the APP is running to obtain access to the server. A status notification 510 is displayed in the locked phone GUI 505 by the mobile APP. The status notification 510 in this example is: "Lane 1 reach the paper low limit." A status notification 515 recites: "Customer at Lane 6, requesting to cancel item #2." A status notification 520 reads: "Lane 8: Application Error." The notifications may have a color corresponding to the key 430, with notifications 510 and 520 being red or "needs attention," and notification 515 being blue in this example, meaning "user request". These notifications are provided chronologically corresponding to time of receipt and are displayed without the user needing to unlock the phone, such as by sliding to the right as indicated at 525. Upon unlocking, the display may return to that shown in FIG. 4, graphically indicating the status of all the POS terminals/lanes. In one embodiment, the notification is identified with the mobile APP: POS Monitoring APP. One benefit of the unlocked phone/mobile device notification is that the manager can quickly triage and visit a POS terminal needing physical intervention, or otherwise prioritize such visits without wasting time unlocking the phone and navigating via additional interactions to identify problems. While three notifications are shown, the number may be fewer, or more, limited only by screen size and readability constraints.

Figure 6A:
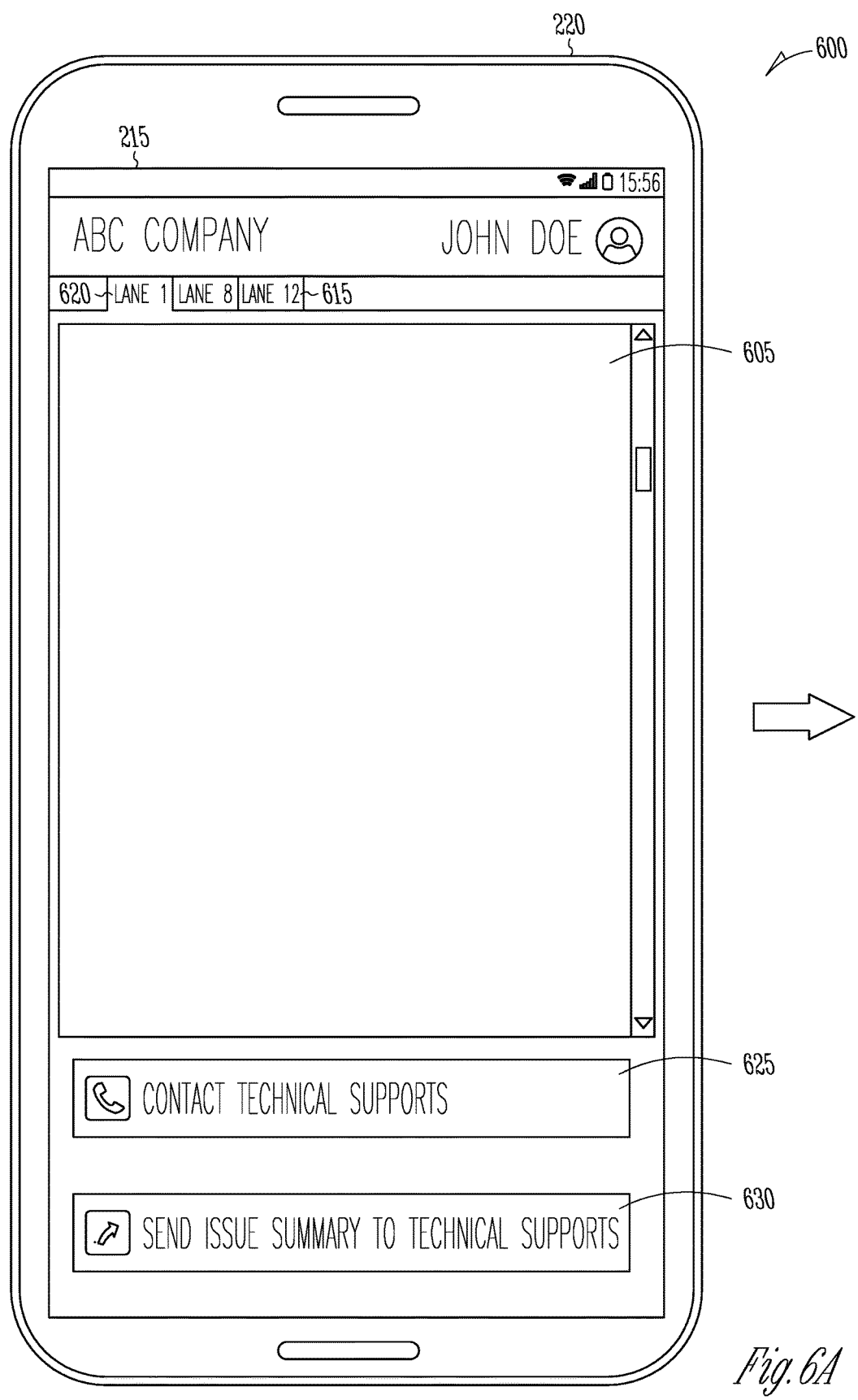
FIG. 6A is a line drawing representation of a GUI with details of a problem at a POS terminal according to an example embodiment.

FIG. 6A is a line drawing representation 600 of a GUI 605 displayed on the screen 215 of the mobile device 220 that may be displayed with details of a problem at a POS terminal provided at text 610. Tabs 615 may be provided to select the lane for which details are desired. In some embodiments, GUI 605 may be navigated to by selecting one of the icons displayed in GUI 405. Lane 1 is the tab 620 that has been selected and corresponds to the displayed text 610, which is shown in further detail in FIG. 6B and shown here:

```
9/4/2018 3:48:28  Received message from 127.0.0.1: SubscribedEventOccurred
sequenceNum = 0
terminal = TerminalInfo
    Address = 127.0.0.1
    UniqueId = f477c905 -3970-4492-9a86-cc527a164ba9
    CustomerCode = 12345
    Properties =
        [0] [TerminalId] = 7606-12345678
        [1] [MachineName] = 7606-12345678
        [2] [UAVersion] = 03.09.02.01
        [3] [CustomerCode] = 12345
        [4] [GUID] = f477c905-3970-4492-9a86-cc527a164ba9
        [5] [IPAddress] = 127.0.0.1
        [6] [MACAddress] = 00:00:00:00:00:00
    CollectorInfo =
        [0] [Version] = 1.4.0.0
eventName = NCR.RPSW.PredictiveServicesCollector.RpswEventLogEntry
eventDetails =
    [0] = ManagementEventInfo
        ClassUri =
NCR.RPSW>PredictiveServicesCollector.RpswEventLogEntry
```

```
    Properties =
        [0] [Source] = NCROposSO.POSPrinter
        [1] [ID] = 11817
        [2] [Type] = Warning
        [3] [Category] = Hardware
        [4] [Message] = The Receipt Station is running low on paper
and will need replaced soon.
meaning:
Model "NCROposSO.POSPrinter", Instance: "POSPrinter 7167 R2" FSMID:
POSPrinter 7167R2
action:
The Receipt Low sensor in the printer has detected that the paper is nearing the end
of the roll. The actual number of transactions of lines that can be printed before
paper is completely out depends on the printer, sensor adjustment, and transactions
sizes. Make sure a replacement roll of paper is available at the site where the printer
is installed. Depending on the store procedures, you may want to replace the papre
now, or wait until an out-of-paper alert is received.
        [5] [Data] = NCR.APTRA.IMgmtServerComms.UANullptr
        [6] [Event TimeStamp] = 04/09/2018 03:48:28 -4
        [7] [UTCTimeStamp] = 9/4/2018 7:48:28 AM
ClassDetails =
    <zero length>
documentFragment = Document
    Uri =
    InstanceName =
    Command = RebuildAndRetrieve (0)
    Data =
```

The displayed text 610 may be quite different for different POS terminals and servers. The above text is simply one example describing that a lane POS terminal has reached a low paper limit. The example displayed text 610 identifies the different types of data that may be provided to aid with resolution of a detected problem. Since the agent generated some if not all of this information in real time as, or soon after an error, failure, or other problem occurred, the response time in fixing the error can be greatly reduced.

GUI 605 may also include a button 625 to initiate a call to technical support, and a further button 630 to send an issue summary to technical support.

Figure 7A:
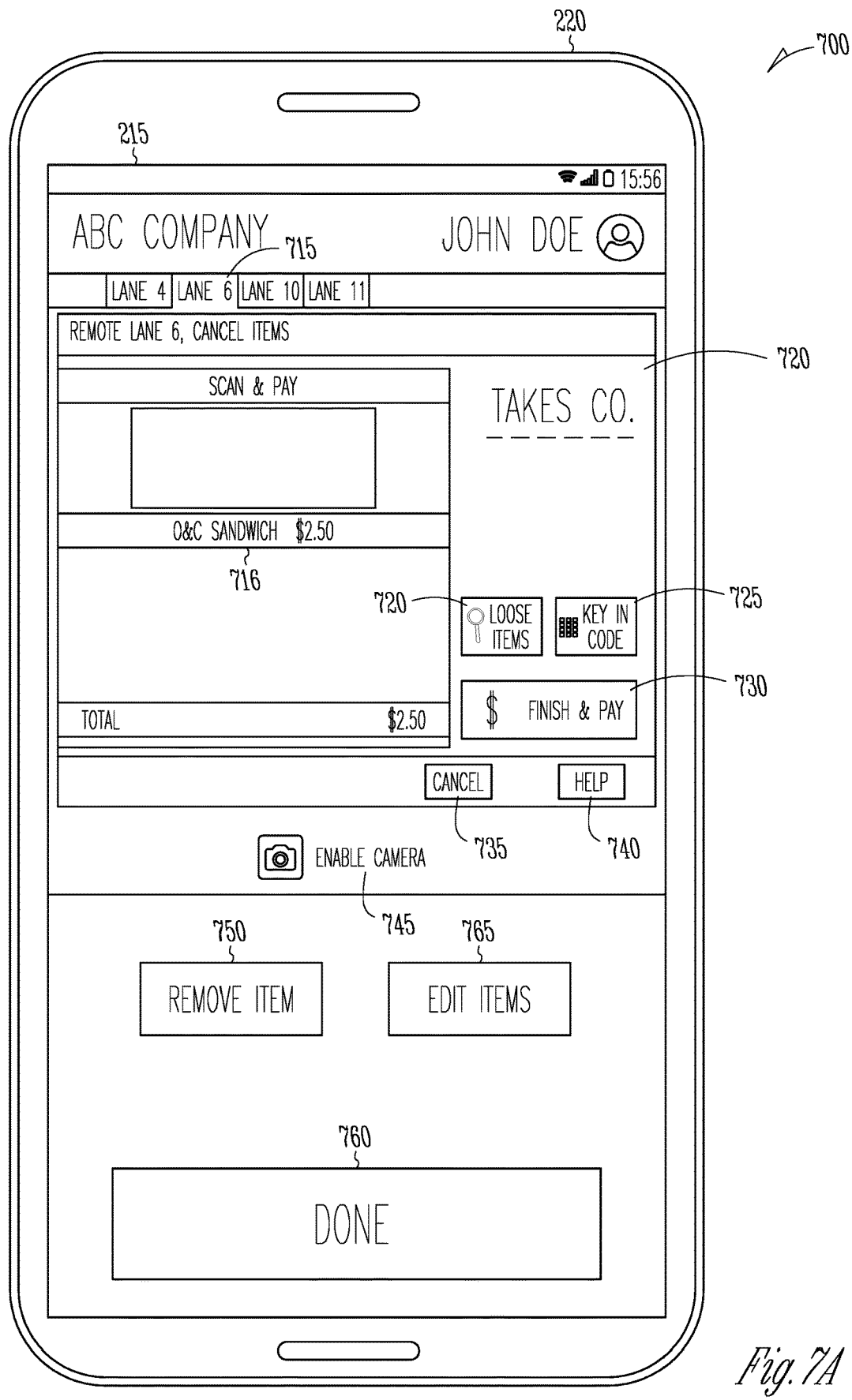
FIG. 7A is a line drawing representation a GUI displayed when selecting an icon corresponding to a user request according to an example embodiment.

FIG. 7A is a line drawing representation 700 of a GUI 705 displayed on the screen 215 of the mobile device 220 that may be displayed when selecting an icon corresponding to a user request. GUI 705 provides a remote view of a display 710 of the display of the POS terminal that is selected via tab 715, corresponding to POS terminal at lane 6. Display 710 includes a list of at least one item 716, in this example: "O&C Sandwich" and a price, shown in pounds in this example. Buttons include loose items 720, key in code 725, and pay 730, cancel 735, and I need help 740. The user may have selected the cancel button 735, or the I need help button 740, resulting in the icon for lane 6 being blue in FIG. 4. An enable camera button 745 is also provided to enable a view of one or more of the POS terminal area and items being scanned, or a view of the user. The manager is also provided a remove item button 750, and edit items button 755, and a done button 760 that may be used to resolve the issue/problem giving rise to the remoting of the POS terminal.

Figure 7B:
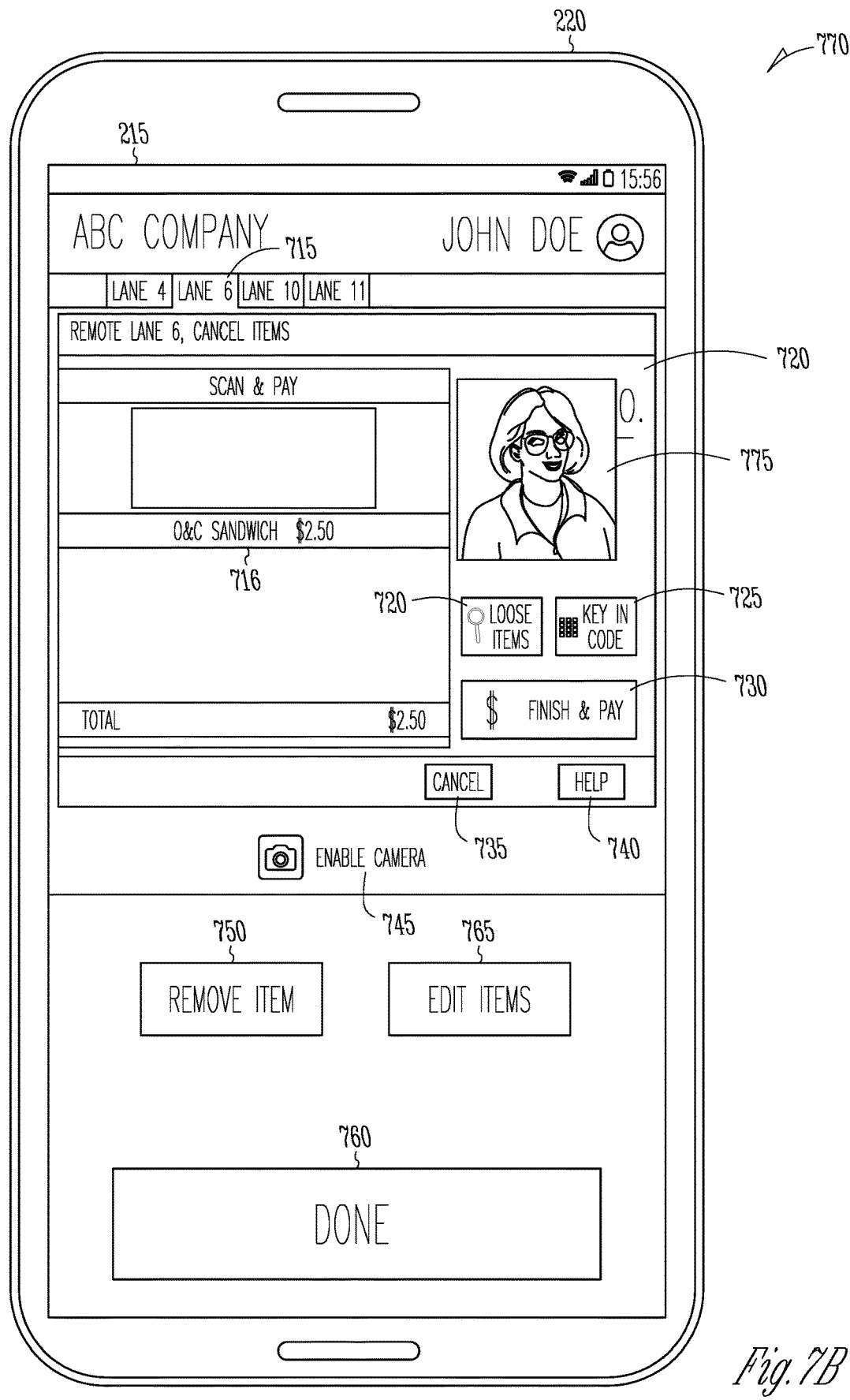
FIG. 7B is a line drawing representation of a GUI displayed in response to selection by the manager/user of the mobile APP of the enable camera button according to an example embodiment.

FIG. 7B is a line drawing representation of a GUI 770, which is the same as GUI 705 with the addition of a video view 775 of the user in response to selection by the manager/user of the mobile APP of the enable camera button 745. Voice may also be provided in conjunction with the video view 775 if microphones and speakers are provided in association with a camera providing the video.

Figure 8:
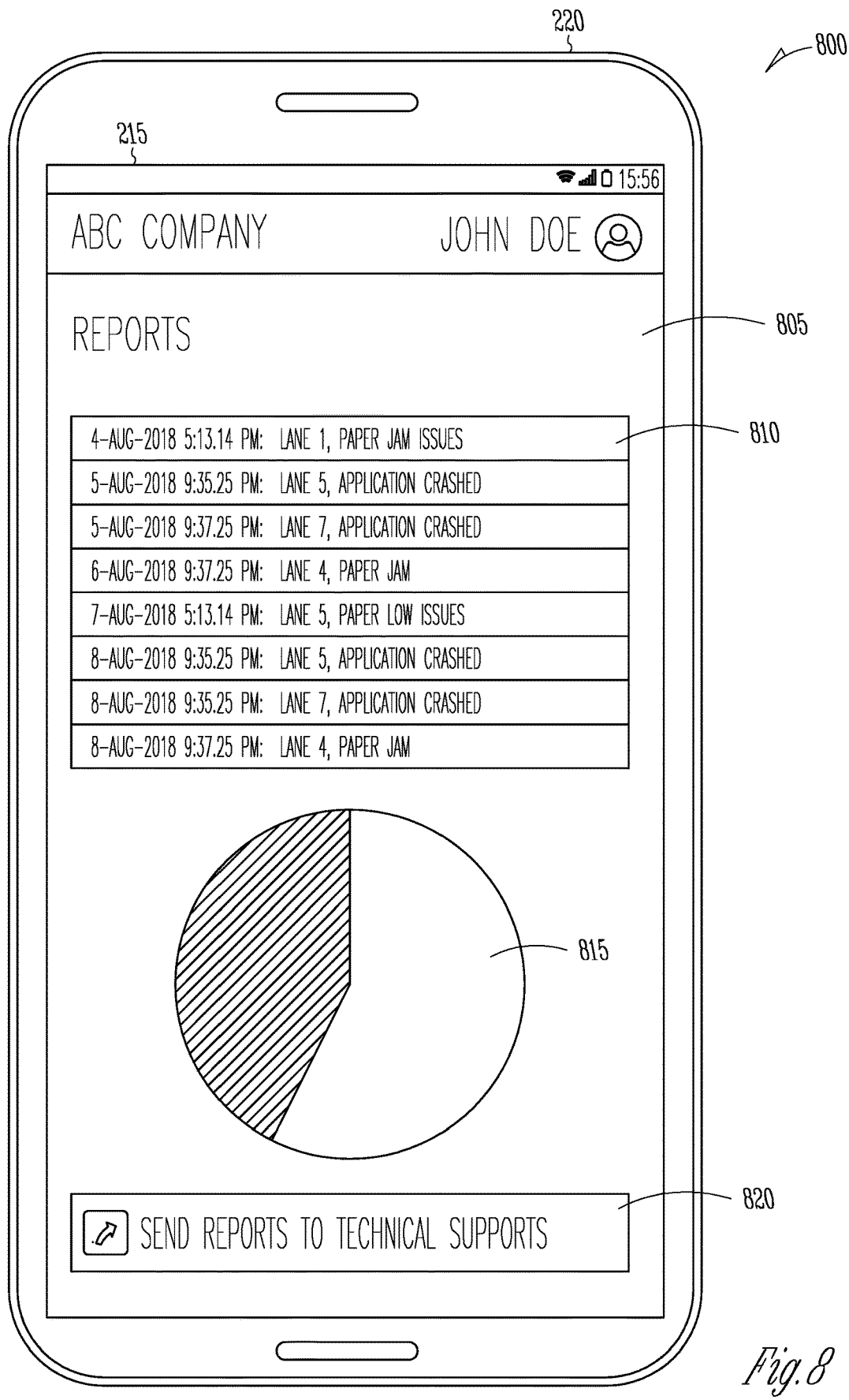
FIG. 8 is a line drawing representation of a GUI displayed to provide graphical reports to send to technical support for analysis and development of strategies to prevent issues from occurring according to an example embodiment.

FIG. 8 is a line drawing representation 800 of a GUI 805 displayed on the screen 215 of the mobile device 220 that may be displayed to provide graphical reports to send to technical support for analysis and development of strategies to prevent issues from occurring. Eight problems are shown as a list 810 of line items in the GUI 805 for example, with a pie chart 815 illustrating a statistic regarding the line items. Any type of statistic may be generated in further embodiments to help identify specific POS terminals that are problematic, or percentages of certain types of failures that occur across all the POS terminals being monitored. In addition to pie charts, other graphical representations, such as graphs and histograms may be provided over any particular set of POS terminals and over any desired time frame. The report may be forwarded to technical support with the touch of button 820. A further screen may be provided to select from pre-defined reports or to select parameters for generating and saving a desired report.

A series of flowcharts are now provided to describe various methods performed by the POS terminals, server, and mobile device.

Figure 9:
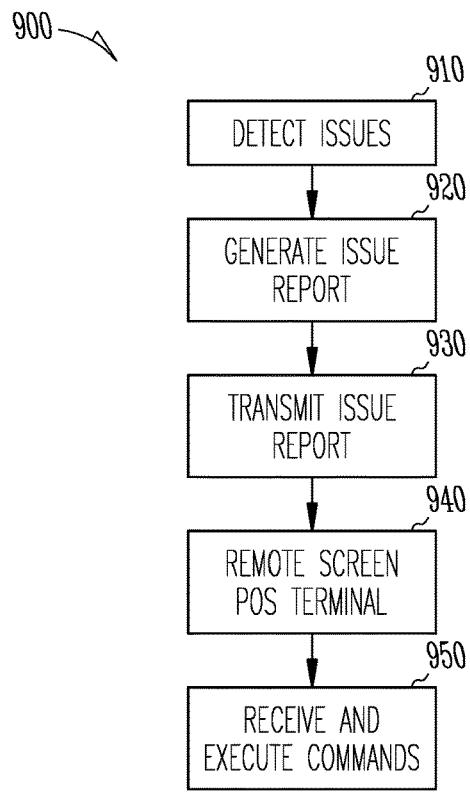
FIG. 9 is a flowchart illustrating a method of monitoring issues on a POS terminal according to an example embodiment.

FIG. 9 is a flowchart illustrating a method 900 of monitoring issues on a POS terminal. The method 900 begins at operation 910 by detecting POS terminal issues via a software agent executing on the POS terminal. At operation 920, an issue report is generated that identifies the issues, labels the issues, and includes an issue description. The issue report is transmitted to a server at operation 930 to generate an interface for a mobile device that provides a graphical user interface (GUI) displayed on a display of the mobile device based on the transmitted issue report that identifies a status of at least one POS terminal.

Detecting POS terminal issues via operation 910 comprises monitoring one or more of operating system event log errors, unfiled agent processes and services running, and registry information. Detecting POS terminal issues may also include detecting selection of a user request to remove an item.

The issue report may be generated and transmitted contemporaneously with the detection of the POS terminal issues by each POS terminal. At operation 940, the agent facilitates remoting a screen of the POS terminal to the mobile device such that the screen of the POS terminal is displayed on the display of the mobile device. The POS terminal may receive commands from the mobile device at operation 950 via the screen of the POS terminal displayed thereon. The command removes an item from the POS terminal screen in some embodiments. Commands may also override an operator mode of the POS terminal. Still further, commands may activate a camera associated with the POS terminal.

Figure 10:
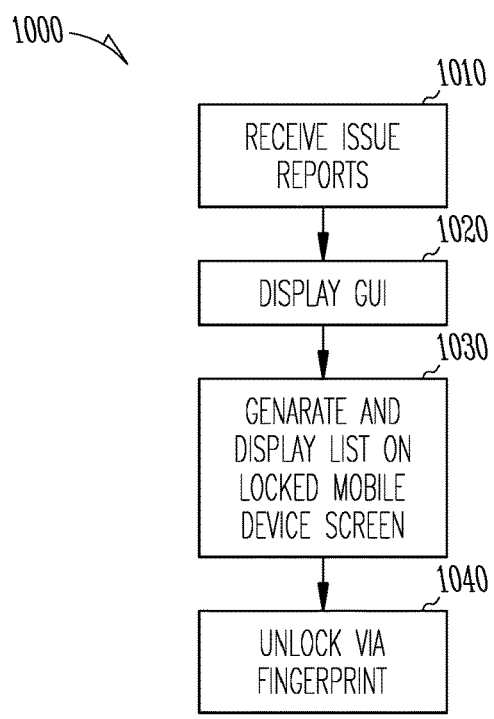
FIG. 10 is a flowchart illustrating a method performed by the mobile device APP according to an example embodiment.

FIG. 10 is a flowchart illustrating a method 1000 performed by the mobile device APP. Method 1000 begins by receiving multiple issue reports at operation 1010 that were generated by software agents executing on respective point of sale (POS) terminals. The issue reports identify an issue existing at the respective POS terminals and may include a label for the issue and an issue description. The method 1000 further includes at operation 1020, displaying an interface for a mobile device that provides a graphical user interface (GUI) displayed on a display of the mobile device based on the transmitted issue reports that identify a status of multiple corresponding POS terminals.

Displaying an interface may be performed by generating a data structure representing information from the issue reports and sending the data structure to the display of the mobile device for rendering and display of the GUI. The GUI may be an icon for each POS terminal representative of the status thereof. Multiple icons may be arranged in an array on the GUI and may have a color that is representative of the status.

The issue reports are received wirelessly from a server coupled to receive the status reports from the POS terminals. In some examples, the mobile device may also operate as the server.

Method 1000 may also include generating a list of POS terminals having issues and displaying at operation 1030, the list on a locked screen of the mobile device. The device may be unlocked at operation 1040 by use of a fingerprint of an authorized user.

Further embodiments enable remoting a display of a selected POS terminal on the mobile device, wherein the mobile device displays a GUI having a remove item button, overriding an operator mode of the POS terminal, receiving a selection of the remove item button, and sending a command to the POS terminal to remove a displayed item from the display of the POS terminal. The remoting GUI may include an enable camera button configured to provide a video view of the POS terminal on the display of the mobile device.

Figure 11:
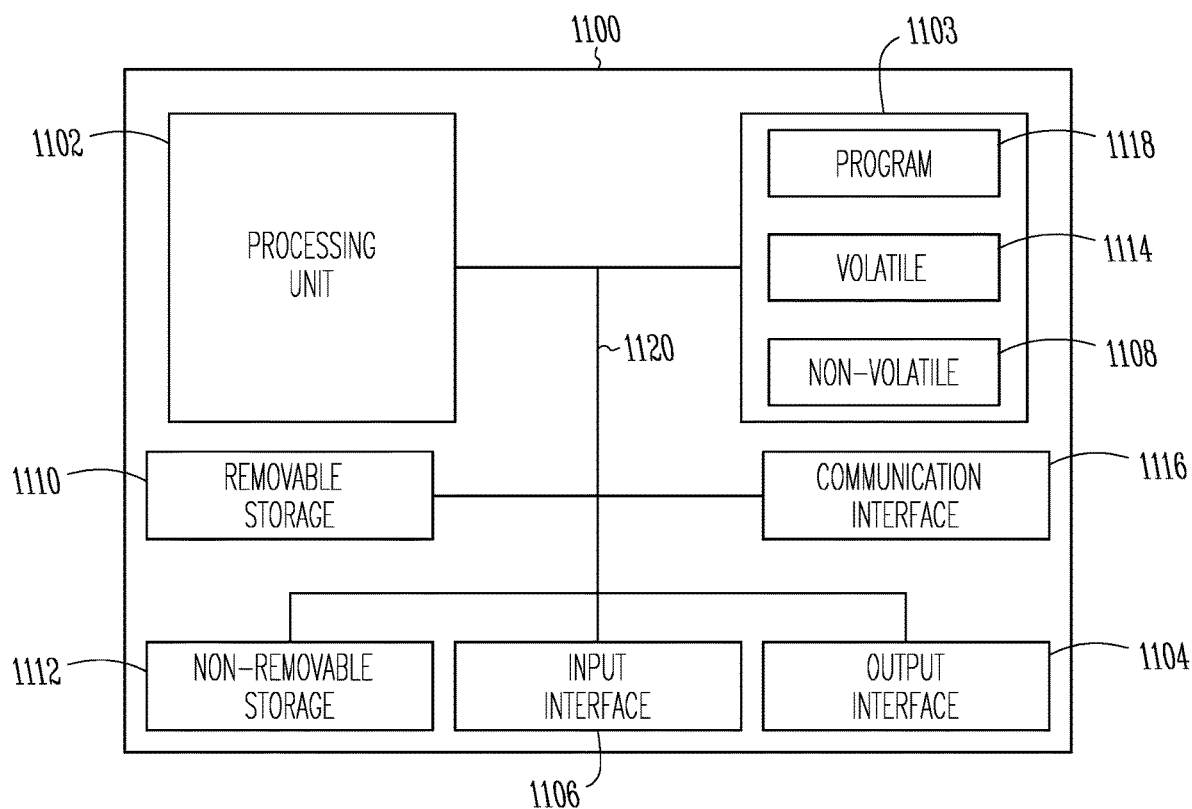
FIG. 11 is a block schematic diagram of a computer system to implement devices and methods for monitoring POS terminals and executing the mobile device APP according to an example embodiment.

FIG. 11 is a block schematic diagram of a computer system 1100 to implement devices and methods for monitoring POS terminals and executing the mobile device APP as well as the agents in the POS terminals, as well as performing other methods and algorithms according to example embodiments. All components need not be used in various embodiments. Servers, POS terminals, and mobile devices may utilize different sets of the described components.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more of the agents, mobile device APP, and server. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

EXAMPLES

POS Terminal Examples

1. A computer implemented method includes detecting point of sale (POS) terminal issues via a software agent executing on the POS terminal, generating an issue report that identifies the issues, labels the issues, and includes an issue description, and transmitting the issue report to a server to generate an interface for a mobile device that provides a graphical user interface (GUI) displayed on a display of the mobile device based on the transmitted issue report that identifies a status of at least one POS terminal.

2. The method of example 1 wherein the issue report is generated and transmitted contemporaneously with the detection of the POS terminal issues by each POS terminal.

3. The method of any of examples 1-2 and further comprising remoting a screen of the POS terminal to the mobile device such that the screen of the POS terminal is displayed on the display of the mobile device.

4. The method of example 3 and further comprising receiving commands from the mobile device via the screen of the POS terminal displayed thereon.

5. The method of example 4 wherein the command removes an item from the POS terminal screen.

6. The method of any of examples 4-5 wherein the command overrides an operator mode of the POS terminal.

7. The method of any of examples 4-6 wherein the command comprises an enable video command, activating a camera associated with the POS terminal.

8. The method of any of examples 1-7 wherein detecting POS terminal issues comprises monitoring one or more of operating system event log errors, unfiled agent processes and services running, and registry information.

9. The method of any of examples 1-8 wherein detecting POS terminal issues comprises detecting selection of a user request to remove an item.

10. A machine-readable storage device has instructions for execution by a processor of the machine to perform operations. The operations include detecting point of sale (POS) terminal issues via a software agent executing on the POS terminal, generating an issue report that identifies the issues, labels the issues, and includes an issue description, and transmitting the issue report to a server to generate an interface for a mobile device that provides a graphical user interface (GUI) displayed on a display of the mobile device based on the transmitted issue report that identifies a status of at least one POS terminal.

11. The device of example 10 wherein the issue report is generated and transmitted contemporaneously with the detection of the POS terminal issues by each POS terminal.

12. The device of any of examples 10-11 and further comprising remoting a screen of the POS terminal to the mobile device such that the screen of the POS terminal is displayed on the display of the mobile device.

13. The device of example 12 and further comprising receiving commands from the mobile device via the screen of the POS terminal displayed thereon.

14. The device of example 13 wherein the command removes an item from the POS terminal screen.

15. The device of example 13 wherein the command overrides an operator mode of the POS terminal.

16. The device of example 13 wherein the command comprises an enable video command, activating a camera associated with the POS terminal.

17. The device of any of examples 10-16 wherein detecting POS terminal issues comprises monitoring one or more of operating system event log errors, unfiled agent processes and services running, and registry information.

18. The device of any of examples 10-16 wherein detecting POS terminal issues comprises detecting selection of a user request to remove an item.

19. A device includes a processor and a memory device coupled to the processor. The memory device has a program stored thereon for execution by the processor to perform operations. The operations include detecting point of sale (POS) terminal issues via a software agent executing on the POS terminal, generating an issue report that identifies the issues, labels the issues, and includes an issue description, and transmitting the issue report to a server to generate an interface for a mobile device that provides a graphical user interface (GUI) displayed on a display of the mobile device based on the transmitted issue report that identifies a status of at least one POS terminal.

20. The device of example 19 wherein the issue report is generated and transmitted contemporaneously with the detection of the POS terminal issues by each POS terminal.

21. The device of any of examples 19-20 and further comprising remoting a screen of the POS terminal to the mobile device such that the screen of the POS terminal is displayed on the display of the mobile device.

22. The device of example 21 and further comprising receiving commands from the mobile device via the screen of the POS terminal displayed thereon.

23. The device of example 22 wherein the command removes an item from the POS terminal screen.

24. The device of any of examples 22-23 wherein the command overrides an operator mode of the POS terminal.

25. The device of any of examples 22-24 wherein the command comprises an enable video command, activating a camera associated with the POS terminal.

26. The device of any of examples 19-25 wherein detecting POS terminal issues comprises monitoring one or more of operating system event log errors, unfiled agent processes and services running, and registry information.

27. The device of any of examples 19-25 wherein detecting POS terminal issues comprises detecting selection of a user request to remove an item.

APP Examples

1. A computer implemented method includes receiving multiple issue reports generated by software agents executing on respective point of sale (POS) terminals, wherein the issue reports identify an issue existing at respective POS terminals, include a label for the issue, and include an issue description. The method further includes displaying an interface for a mobile device that provides a graphical user interface (GUI) displayed on a display of the mobile device based on the transmitted issue reports that identify a status of multiple corresponding POS terminals.

2. The method of example 1 wherein displaying an interface includes generating a data structure representing information from the issue reports and sending the data structure to the display for rendering and display of the GUI.

3. The method of any of examples 1-2 wherein the GUI comprises an icon for each POS terminal representative of the status thereof.

4. The method of example 3 wherein the icons are arranged in an array.

5. The method of any of examples 3-4 wherein each icon has a color that is representative of the status.

6. The method of any of examples 1-5 wherein the issue reports are received wirelessly from a server coupled to receive the status reports from the POS terminals.

7. The method of example 6 wherein the mobile device comprises the server.

8. The method of any of examples 6-7 and further including generating a list of POS terminals having issues and displaying the list on a screen of the mobile device, wherein the mobile device is locked from use.

9. The method of any of examples 1-9 wherein the mobile device is unlocked by use of a fingerprint of an authorized user.

10. The method of any of examples 1-9 and further including remoting a display of a selected POS terminal on the mobile device, wherein the mobile device displays a GUI having a remove item button, overriding an operator mode of the POS terminal, receiving a selection of the remove item button, and sending a command to the POS terminal to remove a displayed item from the display of the POS terminal.

11. The method of example 10 wherein the GUI includes an enable camera button configured to provide a video view of the POS terminal on the display of the mobile device.

12. A machine-readable storage device having instructions for execution by a processor of the machine to perform operations. The operations include receiving multiple issue reports generated by software agents executing on respective point of sale (POS) terminals, wherein the issue reports identify an issue existing at respective POS terminals, include a label for the issue, and include an issue description. The method further includes displaying an interface for a mobile device that provides a graphical user interface (GUI) displayed on a display of the mobile device based on the transmitted issue reports that identify a status of multiple corresponding POS terminals.

13. The device of example 12 wherein displaying an interface includes generating a data structure representing information from the issue reports and sending the data structure to the display for rendering and display of the GUI.

14. The device of any of examples 12-13 wherein the GUI comprises an icon for each POS terminal representative of the status thereof.

15. The device of example 14 wherein the icons are arranged in an array.

16. The device of any of examples 14-15 wherein each icon has a color that is representative of the status.

17. The device of any of examples 12-16 wherein the issue reports are received wirelessly from a server coupled to receive the status reports from the POS terminals.

18. The device of example 17 wherein the mobile device comprises the server.

19. The device of any of examples 17-18 and further including generating a list of POS terminals having issues and displaying the list on a screen of the mobile device, wherein the mobile device is locked from use.

20. The device of any of examples 12-19 wherein the mobile device is unlocked by use of a fingerprint of an authorized user.

21. The device of any of examples 12-21 and further including remoting a display of a selected POS terminal on the mobile device, wherein the mobile device displays a GUI having a remove item button, overriding an operator mode of the POS terminal, receiving a selection of the remove item button, and sending a command to the POS terminal to remove a displayed item from the display of the POS terminal.

22. The device of example 21 wherein the GUI includes an enable camera button configured to provide a video view of the POS terminal on the display of the mobile device.

23. A device comprising a processor and a memory device coupled to the processor. The memory device has a program stored thereon for execution by the processor to perform operations. The operations include receiving multiple issue reports generated by software agents executing on respective point of sale (POS) terminals, wherein the issue reports identify an issue existing at respective POS terminals, include a label for the issue, and include an issue description. The method further includes displaying an interface for a mobile device that provides a graphical user interface (GUI) displayed on a display of the mobile device based on the transmitted issue reports that identify a status of multiple corresponding POS terminals.

24. The device of example 23 wherein displaying an interface includes generating a data structure representing information from the issue reports and sending the data structure to the display for rendering and display of the GUI.

25. The device of any of examples 23-24 wherein the GUI comprises an icon for each POS terminal representative of the status thereof.

26. The device of example 25 wherein the icons are arranged in an array.

27. The device of any of examples 25-26 wherein each icon has a color that is representative of the status.

28. The device of any of examples 23-27 wherein the issue reports are received wirelessly from a server coupled to receive the status reports from the POS terminals.

29. The device of example 28 wherein the mobile device comprises the server.

30. The device of any of examples 28-29 and further including generating a list of POS terminals having issues and displaying the list on a screen of the mobile device, wherein the mobile device is locked from use.

31. The device of any of examples 23-30 wherein the mobile device is unlocked by use of a fingerprint of an authorized user.

32. The device of any of examples 23-31 and further including remoting a display of a selected POS terminal on the mobile device, wherein the mobile device displays a GUI having a remove item button, overriding an operator mode of the POS terminal, receiving a selection of the remove item button, and sending a command to the POS terminal to remove a displayed item from the display of the POS terminal.

33. The device of example 32 wherein the GUI includes an enable camera button configured to provide a video view of the POS terminal on the display of the mobile device.

System Examples

1. A system includes multiple point of sale (POS) terminals, each POS terminal having an agent that detects issues with operation of a respective POS terminal and transmits an issue report having information identifying an issue and the POS terminal having the issue. The system also includes a mobile device coupled to remotely receive the issue reports from the multiple POS terminals and provide a graphical user interface (GUI) displayed on a display of the mobile device based on the transmitted issue report that identifies a status of at least one POS terminal.

2. The system of example 1 and further comprising a server coupled to the POS terminals to receive the issue reports and send the information from the issue reports to the mobile device.

3. The system of example 2 wherein the server is implemented on the mobile device.

4. The system of any of examples 1-3 wherein the issue report is generated and transmitted contemporaneously with the detection of the POS terminal issues by each POS terminal.

5. The system of any of examples 1-4 wherein a screen of the POS terminal is remoted to the mobile device such that the screen of the POS terminal is displayed on the display of the mobile device.

6. The system of example 5 and further comprising sending commands from the mobile device to a selected POS terminal via the screen of the POS terminal displayed on the mobile device.

7. The system of example 6 wherein the command causes the POS terminal to remove an item from the POS terminal screen.

8. The system of any of examples 6-7 wherein the command overrides an operator mode of the POS terminal.

9. The system of any of examples 6-8 wherein the command comprises an enable video command, activating a camera associated with the POS terminal.

10. The system of any of examples 1-9 wherein detecting POS terminal issues comprises monitoring one or more of operating system event log errors, unfiled agent processes and services running, and registry information.

11. The system of any of examples 1-10 wherein the mobile device is configured to generate a data structure representing information from the issue reports and send the data structure to the display for rendering and display of the GUI.

12. The system of any of examples 1-11 wherein the GUI comprises an icon for each POS terminal representative of the status thereof.

13. The system of example 12 wherein the icons are arranged in an array.

14. The system of any of examples 12-13 wherein each icon has a color that is representative of the status.

15. The system of any of examples 1-14 wherein the issue reports are received wirelessly from a server coupled to receive the status reports from the POS terminals.

16. The system of any of examples 1-15 wherein the mobile device is configured to generate a list of POS terminals having issues and display the list on a screen of the mobile device, wherein the mobile device is locked from use.

17. The system of example 16 wherein the mobile device is configured to unlock by use of a fingerprint of an authorized user.

18. The system of any of examples 1-17 wherein the mobile device is configured to remote a display of a selected POS terminal on the mobile device, wherein the mobile device displays a GUI having a remove item button, override an operator mode of the POS terminal, receive a selection of the remove item button, and send a command to the POS terminal to remove a displayed item from the display of the POS terminal.

19. The system of example 18 wherein the GUI includes an enable camera button configured to provide a video view of the POS terminal on the display of the mobile device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   detecting point of sale (POS) terminal issues via a software agent executing on the POS terminal;
   generating an issue report that identifies the issues, labels the issues, and includes an issue description;
   transmitting the issue report to a server to generate an interface for a mobile device that provides a graphical user interface (GUI) displayed on a display of the mobile device based on the transmitted issue report that identifies a status of at least one POS terminal, and
   remoting a screen of the POS terminal to the mobile device such that the screen of the POS terminal is displayed on the display of the mobile device.

2. The method of claim 1 wherein the issue report is generated and transmitted contemporaneously with the detection of the POS terminal issues by each POS terminal.

3. The method of claim 1 and further comprising receiving commands from the mobile device via the screen of the POS terminal displayed thereon.

4. The method of claim 3 wherein the command overrides an operator mode of the POS terminal and removes an item from the PUS terminal screen.

5. The method of claim 1 wherein detecting PUS terminal issues comprises monitoring one or more of operating system event log errors, unfiled agent processes and services running, and registry information.

6. A computer implemented method comprising:
   receiving multiple issue reports generated by software agents executing on respective point of sale (POS) terminals, wherein the issue reports identify an issue existing at respective POS terminals, include a label for the issue, and include an issue description;
   displaying an interface for a mobile device that provides a graphical user interface (GUI) displayed on a display of the mobile device based on the transmitted issue reports that identify a status of multiple corresponding POS terminals; and
   wherein the GUI comprises an icon for each POS terminal representative of the status thereof.

7. The method of claim 6 wherein displaying an interface comprises:
   generating a data structure representing information from the issue reports; and
   sending the data structure to the display for rendering and display of the GUI.

8. The method of claim 6 wherein the icons are arranged in an array.

9. The method of claim 6 wherein each icon has a color that is representative of the status.

10. The method of claim 6 wherein the issue reports are received wirelessly from a server coupled to receive the status reports from the POS terminals.

11. The method of claim 10 wherein the mobile device comprises the server.

12. The method of claim 10 and further comprising:
   generating a list of PUS terminals having issues; and
   displaying the list on a screen of the mobile device, wherein the mobile device is locked from use.

13. The method of claim 6 wherein the mobile device is unlocked by use of a fingerprint of an authorized user.

14. The method of claim 6 and further comprising:
   remoting a display of a selected POS terminal on the mobile device, wherein the mobile device displays a GUI having a remove item button;
   overriding an operator mode of the POS terminal;
   receiving a selection of the remove item button; and
   sending a command to the POS terminal to remove a displayed item from the display of the POS terminal.

15. The method of claim 6 wherein the GUI includes an enable camera button configured to provide a video view of the POS terminal on the display of the mobile device.

16. A system comprising:
   multiple point of sale (POS) terminals, each POS terminal having an agent that detects issues with operation of a respective POS terminal and transmits an issue report having information identifying an issue and the POS terminal having the issue;

a mobile device coupled to remotely receive the issue reports from the multiple POS terminals and provide a graphical user interface (GUI) displayed on a display of the mobile device based on the transmitted issue report that identifies a status of at least one POS terminal; and wherein the at least one POS terminal is configured to remote a screen of the at least one POS terminal to the mobile device such that the screen of the POS terminal is displayed on the display of the mobile device.

17. The system of claim 16 and further comprising a server coupled to the POS terminals to receive the issue reports and send the information from the issue reports to the mobile device.

18. The system of claim 17 wherein the server is implemented on the mobile device.

\* \* \* \* \*